United States Patent Office 3,428,700
Patented Feb. 18, 1969

3,428,700
PREPARATION OF POLYCYCLIC
HYDROCARBONS
Henryk A. Cyba, Evanston, Ill., assignor to Universal Oil
Products Company, Des Plaines, Ill., a corporation of
Delaware
No Drawing. Filed Dec. 2, 1966, Ser. No. 598,619
U.S. Cl. 260—670        10 Claims
Int. Cl. C07c 3/10

ABSTRACT OF THE DISCLOSURE

Non-condensed polycyclic hydrocarbons can be prepared by treating an aromatic hydrocarbon with oxygen in the presence of a chain transfer agent and water, at elevated temperatures. Toluene can be converted to bibenzyl.

This invention relates to a process for the preparation of polycyclic hydrocarbons. More particularly, the invention relates to a process whereby aromatic hydrocarbons may be converted to non-condensed polycyclic hydrocarbons by a process involving a free-radical process.

It has now been discovered that aromatic hydrocarbons may be treated in such a manner whereby said hydrocarbons are converted to non-condensed polycyclic hydrocarbons. These non-condensed polycyclic hydrocarbons may find a wide variety of uses in the chemical field. For example, an aromatic hydrocarbon such as toluene may be converted to a non-condensed polycyclic hydrocarbon such as bibenzyl in a manner hereinafter set forth in greater detail, said bibenzyl being important as an intermediate in the preparation of styrene and benzene. It is, of course, well-known that styrene forms an important element in the production of other chemical compounds such as plastics, resins, rubber-like compounds, bibenzyl may be also dehydrogenated to stilbene, which in turn can be oxidized or ozonized to benzaldehyde or any other corresponding aldehyde, or may be nitrated to produce the corresponding nitrates and after reduction, form the corresponding amines, etc. For purposes of this invention, the term "aromatic hydrocarbon" as used in the present specification and appended claims will refer to both non-substituted and alkyl- or cycloalkyl-substituted aromatic hydrocarbons.

It is therefore an object of this invention to provide a process for preparing a non-condensed polycyclic hydrocarbon.

A further object of this invention is to provide a process for converting an aromatic hydrocarbon to a non-condensed polycyclic hydrocarbon in a free radical reaction.

In one aspect, an embodiment of this invention resides in a process for preparing a non-condensed polycyclic hydrocarbon which comprises treating an aromatic hydrocarbon with an oxygen-containing gas in the presence of a compound containing at least one hydrogen atom which is abstractable by a free radical mechanism reaction and water at a temperature above about 200° C., and recovering the resultant non-condensed polycyclic hydrocarbon.

A specific embodiment of this invention is found in a process for the conversion of toluene which comprises treating said toluene with an oxygen-containing gas in the presence of water and thiophenol at a temperature of about 230° C., and recovering the resultant bibenzyl.

Other objects and embodiments will be found in the following further detailed description of this invention.

As hereinafter set forth, the present invention is concerned with a process for obtaining non-condensed polycyclic aromatic hydrocarbons by converting an aromatic hydrocarbon to said compound by treatment with an oxygen-containing gas in the presence of water and a chain-transfer agent. It is also contemplated within the scope of this invention that the process may, if so desired, be effected in the presence of certain catalytic compositions of matter of a type hereinafter set forth in greater detail. The process is effected by treating the particular aromatic hydrocarbon with an oxygen-containing gas in the presence of water and the aforementioned chain-transfer agent which comprises a compound containing an abstractable hydrogen atom at elevated temperature. In the preferred embodiment of this process, the conversion is effected at elevated temperatures ranging from about 200° C. up to about 250° C. or more and preferably in a range of from about 225° C. to about 240° C. Examples of aromatic hydrocarbons which may be oxidized to the desired non-condensed polycyclic hydrocarbon include benzene, toluene, o-xylene, m-xylene, p-xylene, ethylbenzene, n-propylbenzene, cumene (isopropylbenzene), o-diethylbenzene, p-diethylbenzene, 1-methylnaphthalene, 2-methylnaphthalene, 1-ethylnaphthalene, 2-ethylnaphthalene, etc. It is to be understood that the aforementioned compounds are only representative of the hydrocarbons which may be converted according to the process of this invention, and that said invention is not necessarily limited thereto.

Chain-transfer agents which may be utilized comprise those compounds which contain at least one hydrogen atom which is abstractable by a free-radical mechanism. The preferred types of compounds which may be used comprise those containing a halogen substituent or a sulfur substituent and include chloromethane, dichloromethane, chloroform, bromomethane, dibromomethane, bromoform, chloroethane, 1,1-dichloroethane, 1,1,1-trichloroethane, carbontetrachloride, bromoethane, 1,1-dibromoethane, 1,1,1-tribromoethane, etc., sulfur-containing compounds such as thiophenol, methyl mercaptan, ethyl mercaptan, n-propyl mercaptan, isopropyl mercaptan, n-butyl mercaptan, etc. One criterion which these compounds must possess is that said chain-transfer agents possess an active hydrogen atom which is more easily abstractable than the hydrogens of the alkyl substituents on aromatic hydrocarbons which make up the starting materials for the present process. These chain-transfer agents are present in the reaction mixture in a relatively small amount ranging from about 0.002 to about 0.01 mole of chain-transfer agent per mole of aromatic hydrocarbon. In addition, the reaction is also effected in the presence of water, said water being present in an amount ranging from about 2 to about 4 moles of water per mole of aromatic hydrocarbon feed stock. The oxygen-containing gas which is used may comprise air or oxygen, the former being preferred due to the low cost and, in addition to acting as an oxidizing agent will also afford the elevated pressures at which the process of this invention is effected, said pressures ranging from about 2 to about 100 atmospheres or more.

It is also contemplated within the scope of this invention that the reaction described herein may be effected in the presence of certain catalytic compositions of matter. The preferred catalysts which may be used comprise salts, both inorganic and organic, of the transition metal series including iron, cobalt, nickel, platinum, palladium, ruthenium, rhodium, osmium and iridium, specific examples of these catalysts including ferric nitrate, ferrous nitrate, nickelic nitrate, nickelous nitrate, cobaltic nitrate, cobaltous nitrate, platinum chloride, palladium chloride, ferric sulfate, nickel sulfate, cobalt sulfate, ferric acetate, nickel acetate, cobalt acetate, etc. Of these salts, the preferred catalysts comprise those which are least corrosive in nature, the nitrates falling within this category. In addition, it is also contemplated within the scope of this invention that cupric nitrate, cupric sulfate, cupric acetate, etc., may also be used. While the above discussion of catalysts describes the use of those salts of the transition metal series or copper which are least corrosive in nature, it is also possible to utilize more corrosive salts such as the halides of the transition metals including ferric chloride, ferrous chloride, ferric bromide, ferrous bromide, nickel chloride, nickel bromide, copper chloride, copper bromide, etc., if the apparatus which is used consists of glass or other materials which are resistant to corrosion. Other transition metal salts such as phosphates, oxalates, phenates, benzoates, borates, chromates, dichromates, etc. may also be used providing that the catalysts possess the properties of being soluble in the charge, non-corrosive to the reactor material and stable under the operating conditions of the reaction.

The process of this invention may be effected in any suitable manner and may comprise a batch or continuous type operation. For example, when a batch type operation is used, a quantity of the aromatic hydrocarbon to be converted is placed in an appropriate apparatus such as, for example, a rotating or stirred autoclave which may be lined with glass. The autoclave is sealed after the addition of the chain-transfer agent and water and heated to the desired temperature which is above about 200° C. while the oxygen-containing gas is charged thereto. Upon completion of the desired residence time, the autoclave and contents thereof are allowed to cool to room temperature, the excess pressure is vented and the reaction mixture recovered. The reaction mixture is then subjected to conventional means for separation and purification including extracting with an organic solvent, distillation to remove the solvent followed by separation of the aromatic aldehydes, acids, alcohols, which comprise oxidation products from the non-condensed polycyclic aromatic hydrocarbons which comprise the desired product of this reaction.

It is also contemplated that the process of this invention may be effected in a continuous manner of operation. When such a type of operation is used, the aromatic hydrocarbon is continuously charged to a reaction zone which is maintained at the proper operating conditions of temperature and pressure. In addition, the water and chain-transfer agent may also be continuously charged thereto through separate streams. If so desired, the chain-transfer agent may be admixed with the aromatic hydrocarbon prior to entry into said reactor and charged thereto in a single stream. Upon completion of the desired residence time, the reactor effluent is continuously withdrawn and subjected to conventional separation means, the unreacted starting materials being recycled to the reaction zone to form a portion of the feed stock, while the oxidized, partially oxidized and non-condensed aromatic hydrocarbon products are separated by fractional distillation into the various components and recovered. It is contemplated within the scope of this invention that the products of the reaction may be recovered by other conventional means such as, for example, by extraction with bases, extraction with silica gels, molecular sieves or ion exchange resins, by a combination of extractive separations with distillation, or by any other type of fractionation. It is to be further understood that the aforementioned description of the types of processes by which the process of this invention may be effected may also include the use of catalysts of the type hereinbefore set forth. In the event that the operation is effected in the presence of a catalytic composition of matter, this element of the reaction is present in either the autoclave or the continuous type operation vessel.

Examples of non-condensed polycyclic hydrocarbons which may be prepared according to the process of this invention include biphenyl, bibenzyl, 2,2'-dimethylbibenzyl, 3,3'-dimethylbibenzyl, 4,4'-dimethylbibenzyl, or mixed 2,4'-dimethylbibenzyl, binaphthyl, etc. It is to be understood that the aforementioned compounds are only representative of the class of non-condensed aromatic hydrocarbons which may be prepared according to the process described herein and that the present invention is not necessarily limited thereto.

The following examples are given to illustrate the process of the present invention which, however, are not intended to limit the generally broad scope of the present invention in strict accordance therewith.

Example I

In this example, 92 g. (1 mole) of toluene and 4 moles of water were placed in a glass liner of an 850 cc. autoclave. In addition, 0.4 g. (0.0044 mole) of n-butyl mercaptan were added and the autoclave was sealed. The autoclave was then heated to a temperature of 230° C. and air pressed in until an initial pressure of 60 atmospheres are reached. The autoclave was maintained at this temperature for a period of 24 hours, at the end of which time the autoclave and contents thereof were allowed to cool to room temperature. The excess pressure was vented and the water layer was separated and extracted with ether. The ether extracts were then distilled to remove a major portion of the solvent and mixed with the oxidized and the condensed organic fraction. The fraction was subjected to an analysis and there was determined by a gas-liquid chromatographic analysis that there has been a 20% conversion, 37.0% of this conversion being specifically bibenzyl.

Example II

A mixture of 92 g. (1.0 mole) of toluene and 72 g. (4.0 moles) of water were placed in a rotating autoclave. In addition, the autoclave also contained 0.506 g. (0.0046 mole) of thiophenol. The autoclave was sealed and heated to a temperature of 230° C. Air was pressed in until an initial pressure of 60 atmospheres was reached. The reactor was maintained at this temperature for a period of 1 hour following which the autoclave was cooled and the excess pressure was vented. The reaction product was treated in a manner similar to that hereinbefore set forth in Example I. There was a 21.8% conversion to oxidized and converted hydrocarbons of which 36.7% comprised bibenzyl.

Example III

The above experiment was repeated using chloroform as a chain-transfer agent and 0.497 g. of ferrous chloride as a catalyst. Inasmuch as the reaction was effected in the glass lined rotating autoclave it was possible to use the ferrous chloride as the catalytic agent. The autoclave was sealed, heated to 230° C. and 40 atmospheres of air was pressed in. Upon completion of a 1 hour residence time, the autoclave was cooled and the excess pressure was vented. After treatment of the product in a manner similar to that set forth, a gas-liquid chromatographic analysis determined that there was a 21.4% conversion of which 38.7% comprised bibenzyl.

Example IV

In this example, 106 g. (1.0 mole) of p-xylene and 72 g. (4.0 moles) of water are placed in the glass liner of a rotating autoclave. In addition, 0.5 g. of ferric chloride and chloroform are added. The autoclave is sealed and heated to a temperature of about 230° C. while air is pressed in until an initial pressure of 60 atmospheres is reached. The autoclave is maintained at this temperature for a period of about 2 hours, at the end of which time, the autoclave and contents thereof are cooled to room temperature. The excess pressure is vented and the reaction product is recovered. After treatment of the product in a manner similar to that set forth in Example I above, a gas-liquid chromatographic analysis will show the presence of 4,4'-dimethylbibenzyl.

I claim as my invention:

1. A process for preparing a non-condensed polycyclic hydrocarbon which comprises treating an aromatic hydrocarbon with an oxygen-containing gas in the presence of a chain transfer agent and water at a temperature above about 200° C.

2. The process as set forth in claim 1, further characterized in that said process is effected in the presence of a catalyst comprising a salt of a transition series metal or copper.

3. The process as set forth in claim 1, further characterized in that said chain transfer agent comprises a halo-substituted organic compound.

4. The process as set forth in claim 3, further characterized in that said chain transfer agent comprises chloroform.

5. The process as set forth in claim 1, further characterized in that said chain transfer agent comprises a sulfur containing organic compound.

6. The process as set forth in claim 5, further characterized in that said chain transfer agent comprises thiophenol.

7. The process as set forth in claim 2, further characterized in that said catalyst comprises ferric nitrate.

8. The process as set forth in claim 1, further characterized in that said aromatic hydrocarbon comprises toluene and said non-condensed polycyclic hydrocarbon comprises bibenzyl.

9. The process as set forth in claim 1, further characterized in that said aromatic hydrocarbon comprises benzene and said non-condensed polycyclic hydrocarbon comprises biphenyl.

10. The process as set forth in claim 1, further characterized in that said aromatic hydrocarbon comprises p-xylene and said non-condensed polycyclic hydrocarbon comprises 4,4'-dimethylbibenzyl.

References Cited

UNITED STATES PATENTS

| | | | |
|---|---|---|---|
| 2,614,130 | 10/1952 | Pines et al. | 260—670 X |
| 3,346,622 | 10/1967 | Selwitz et al. | 260—670 X |
| 3,349,117 | 10/1967 | Selwitz et al. | 260—670 X |

DELBERT E. GANTZ, *Primary Examiner.*

CURTIS R. DAVIS, *Assistant Examiner.*

U.S. Cl. X.R.

260—668